(12) United States Patent
Ryu et al.

(10) Patent No.: US 7,957,761 B2
(45) Date of Patent: Jun. 7, 2011

(54) METHOD OF COMMUNICATING NEIGHBOR BASE STATION INFORMATION

(75) Inventors: Ki Seon Ryu, Seoul (KR); Chang Jae Lee, Chungcheongnam-do (KR); Yong Suk Jin, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 822 days.

(21) Appl. No.: 11/126,820

(22) Filed: May 10, 2005

(65) Prior Publication Data

US 2005/0272403 A1 Dec. 8, 2005

(30) Foreign Application Priority Data

May 10, 2004 (KR) .................. 10-2004-0032678

(51) Int. Cl.
*H04B 7/00* (2006.01)
(52) U.S. Cl. ......................................... 455/524
(58) Field of Classification Search .................. 455/524
See application file for complete search history.

(56) References Cited

U.S. PATENT DOCUMENTS

| | | | | |
|---|---|---|---|---|
| 6,128,469 | A * | 10/2000 | Zenick et al. | 455/12.1 |
| 6,201,969 | B1 * | 3/2001 | Meier | 455/442 |
| 2002/0118656 | A1 * | 8/2002 | Agrawal et al. | 370/329 |
| 2003/0003913 | A1 | 1/2003 | Chen et al. | |
| 2003/0064752 | A1 | 4/2003 | Adachi et al. | |
| 2003/0153314 | A1 * | 8/2003 | Kim et al. | 455/436 |
| 2004/0156320 | A1 * | 8/2004 | Hammer et al. | 370/252 |
| 2004/0185853 | A1 * | 9/2004 | Kim et al. | 455/438 |
| 2004/0219926 | A1 * | 11/2004 | Kim et al. | 455/452.2 |
| 2005/0091494 | A1 * | 4/2005 | Hyser | 713/171 |
| 2007/0032255 | A1 * | 2/2007 | Koo et al. | 455/512 |
| 2007/0109099 | A1 * | 5/2007 | Raphaeli et al. | 340/10.2 |

FOREIGN PATENT DOCUMENTS

| | | |
|---|---|---|
| CN | 1237870 | 12/1999 |
| EP | 0 963 130 B1 | 9/2001 |
| JP | 2000-013843 | 1/2000 |
| JP | 2003-348007 | 12/2003 |

(Continued)

OTHER PUBLICATIONS

Itzik Kitroser: "IEEE 802.16e Handoff Draft", IEEE C802.16e-03/20r1, [online], Mar. 13, 2003 sections 2.1, 2.5, 3.1, 5.1 & 6.1.
Zhun Zong: "RRM and Roaming Support", IEEE 802.11-03/078r0, [online], Jan. 14, 2003 slides 2-11.

(Continued)

*Primary Examiner* — Duc Nguyen
*Assistant Examiner* — Ankur Jain
(74) *Attorney, Agent, or Firm* — Lee, Hong, Degerman, Kang & Waimey

(57) ABSTRACT

A method uses inter-base station control messages to provide neighbor base station information to mobile subscriber stations in a mobile communication system. The method includes obtaining, at a serving base station, physical channel information of neighbor base stations over a backbone network via, either directly or via a server; periodically transmitting the obtained physical channel information from the serving base station to a mobile subscriber station connected to the serving base station; and measuring, based on the updated physical channel information, signal quality of the at least one neighbor base station at the mobile subscriber station. Thus, the serving base station receives from the neighbor base stations the inter-base station control messages containing the neighbor base station information, updates the information, and provides the updated information to the corresponding mobile subscriber station(s), to be used for a specific purpose such as handover or network entry.

18 Claims, 9 Drawing Sheets

FOREIGN PATENT DOCUMENTS

| | | |
|---|---|---|
| KR | 1020020060390 | 7/2002 |
| KR | 10-2003-0009193 | 1/2003 |
| KR | 10-2003-0003464 | 10/2003 |
| WO | 0060895 | 10/2000 |

OTHER PUBLICATIONS

Leiba, Y.; "Handoff Procedures for 802.16e—Handoff Ad-Hoc"; Doc. No. IEEE S802.16e-03/20; Mar. 12, 2003.

* cited by examiner

METHOD OF COMMUNICATING NEIGHBOR BASE STATION INFORMATION

This application claims the benefit of Korean Application No. 10-2004-0032678 filed on May 10, 2004, which is hereby incorporated by reference.

BACKGROUND OF THE INVENTION

1. Field of the Invention

The present invention relates to a method of communicating neighbor base station information to mobile subscriber stations in a mobile communication system.

2. Discussion of the Related Art

In a broadband wireless access system such as a radio mobile Internet system, a mobile subscriber station receives a signal from a neighbor base station and measures a signal quality to find an optimal base station prior to performing handover. If the signal quality of the neighbor base station is superior to that of a serving base station, the mobile subscriber station performs a handover procedure. In doing so, it should be noted that the mobile subscriber station in the radio mobile Internet system performs handover between base stations over an air backbone.

A mobile subscriber station tunes its synchronization with a neighbor base station, receives a signal to measure a signal quality, and previously transmits/receives parameters required for handover to/from a handover target base station. Hence, a quick handover is enabled when handover is substantially performed. Namely, a serving base station periodically transmits information of a neighbor base station to all mobile subscriber stations within the serving base station via a broadcast message. The transmitted information, referred to herein as neighbor base station information, includes, for example, the downlink center frequency, base station identifier(s), and uplink/downlink channel information.

The mobile subscriber station having received the information of the neighbor base stations releases its connection to the serving base station during a specific period, acquires syncs from the neighbor base stations, and then receives signals to measure respective signal qualities.

A handover procedure of a medium access control (MAC) layer according to a related art is explained as follows.

Referring to FIG. 1, illustrating a network topology advertisement, a serving base station delivers information of neighbor base stations to all mobile subscriber stations within the serving base station using a MAC control message. The MAC control message provides physical channel information including uplink/downlink channel information of the neighbor base stations. The mobile subscriber station having received the message can acquire sync with the neighbor base station efficiently.

Referring to FIG. 2, illustrating a neighbor base station scanning process, a serving base station allocates a time for monitoring a neighbor base station to a mobile subscriber station to find a target base station fitting for handover. The allocated time is called a scanning period. During the scanning period, the mobile subscriber station releases its connection to a current serving base station, tunes its sync with a downlink transmission signal of the neighbor base station, and measures a quality of a physical channel. During the scanning period, the serving base station buffers downlink data that will be transferred to the mobile subscriber station. If the scanning period expires, the serving base station transmits the buffered data to the mobile subscriber station. In doing so, by measuring a signal quality transferred from the neighbor base station and by previously exchanging parameters that will be exchanged in handover with a potential handover target base station, a procedure enabling a quick handover in case that a real handover occurs is carried out as well.

Referring to FIG. 3, illustrating a handover initiation process, a signal quality of a neighbor base station is measured. If there exists a neighbor base station having the signal quality superior to that of a serving base station, a procedure for performing a handover is executed. Namely, a mobile subscriber station initiates a handover in a manner of delivering a handover request message to a handover target base station to the serving base station.

However, even though the neighbor base station information provided to the mobile subscriber station by the serving base station is defined in a broadcast control message, the related art method fails to propose how the serving base station acquires the neighbor base station information.

SUMMARY OF THE INVENTION

Accordingly, the present invention is directed to a method of communicating neighbor base station information to mobile subscriber stations in a mobile communication system that substantially obviates one or more problems due to limitations and disadvantages of the related art.

An object of the present invention is to provide a method of communicating neighbor base station information to mobile subscriber stations in a mobile communication system, by which a serving base station acquires information of the neighbor base stations via a backbone network in the mobile communication system to provide the acquired information to the corresponding mobile subscriber station.

Another object of the present invention is to provide a method of communicating neighbor base station information to mobile subscriber stations in a mobile communication system, in which base station information is exchanged between base stations via inter-base station control messages.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a method of communicating neighbor base station information in a mobile communication system. The method comprises obtaining, at a first base station, neighbor base station information from at least one neighbor base station, the neighbor base station information corresponding to the at least one neighbor base station and being provided to the first base station over a backbone network; and transmitting the obtained neighbor base station information from the first base station to a mobile subscriber station connected to the first base station. The mobile subscriber station then can use the neighbor base station information for a specific purpose.

According to another aspect of the present invention, there is provided a method of communicating neighbor base station information in a mobile communication system. The method comprises obtaining, at a serving base station, physical channel information exchanged over a backbone network using a plurality of inter-base station control messages, the physical channel information corresponding to at least one neighbor base station; periodically transmitting the obtained physical channel information from the serving base station to a mobile subscriber station connected to the serving base station, the obtained physical channel information being updated for each transmission; and measuring, based on the updated physical channel information, signal quality of the at least one neighbor base station at the mobile subscriber station.

Preferably, the inter-base station control messages are delivered between a server and each of the neighbor base stations using the server operating between the serving base station and the neighbor base stations.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
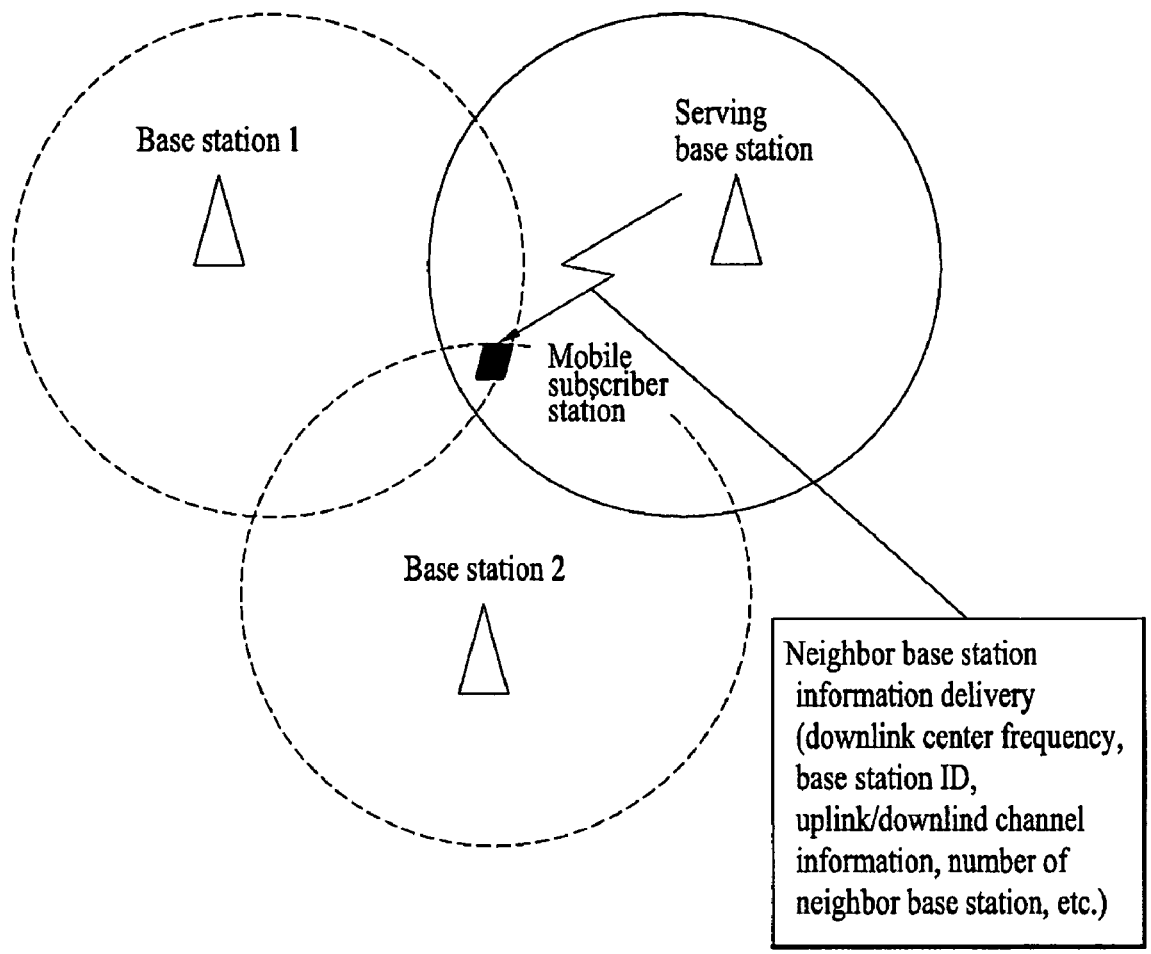
FIG. 1 is a diagram illustrating a network topology advertisement operation according to a related art.
Figure 2:
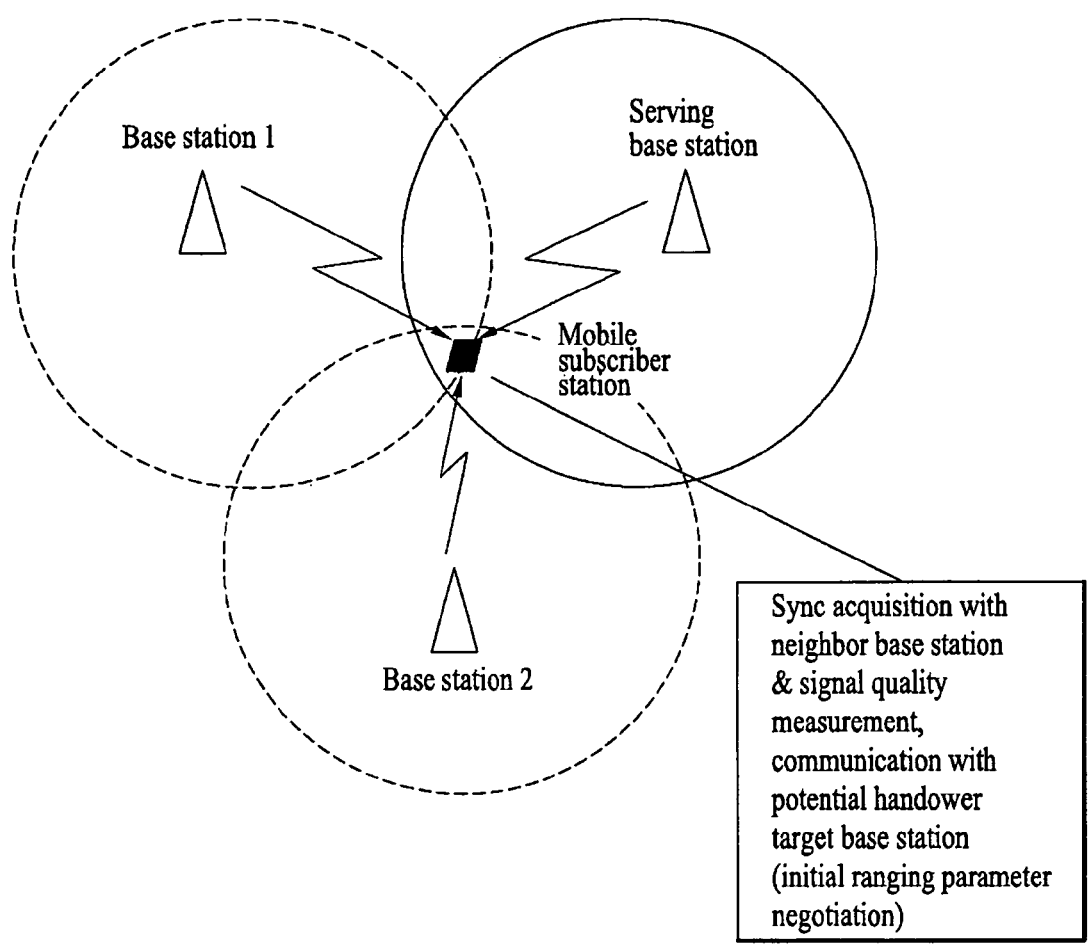
FIG. 2 is a diagram illustrating a neighbor base station scanning operation according to a related art.
Figure 3:
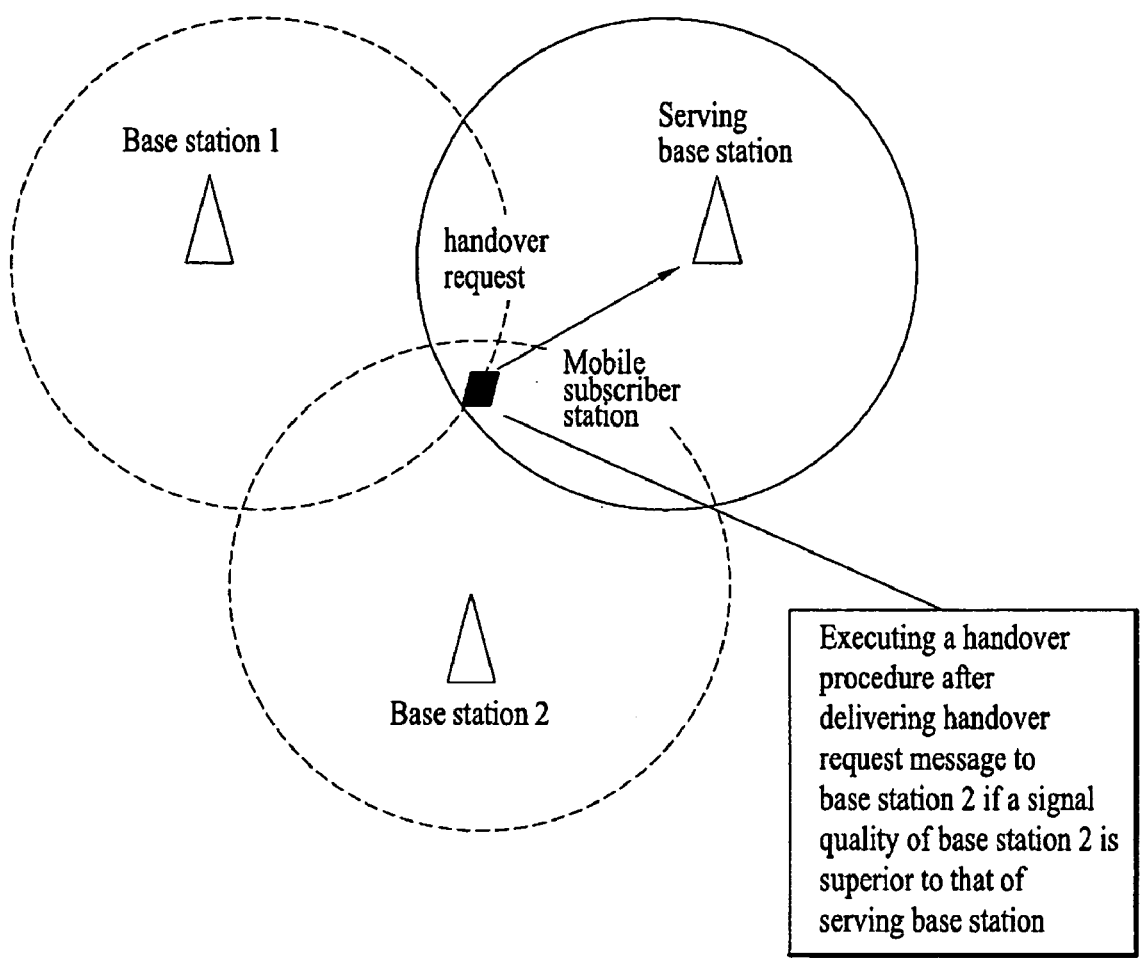
FIG. 3 is a diagram illustrating a handover initiation operation according to a related art.

Reference will now be made in detail to the preferred embodiments of the present invention, examples of which are illustrated in the accompanying drawings.

In the embodiments of the present invention, to provide neighbor base station information in such a mobile communication system as a broadband wireless access system, a serving base station directly obtains information of at least one neighbor base station from the at least one neighbor base station over a backbone network. The serving base station transmits the information of the neighbor base stations to at least one mobile subscriber station belonging to the serving base station. Hence, the at least one mobile subscriber station can use the information of the at least one neighbor base station for a specific purpose.

The serving base station directly obtains physical channel information of the neighbor base stations from the neighbor base stations over the backbone network via inter-base station control messages. The serving base station periodically transmits the obtained physical channel information to the at least one mobile subscriber station belonging to a governing domain of the serving base station. The at least one mobile subscriber station uses the obtained physical channel information in measuring a signal quality of the at least one neighbor base station.

The neighbor base station information contains a base station identifier, physical frequency, uplink channel descriptor (UCD), and downlink channel descriptor (DCD). As mentioned in the foregoing description, the serving base station exchanges the inter-base station control messages with the at least one neighbor base station to obtain the information of the at least one neighbor base station.

The information of the at least one neighbor base station is transmitted to the at least one mobile subscriber station belonging to the governing domain of the serving base station from the serving base station via a message. The information of the at least one neighbor base station is periodically transmitted to the at least one mobile subscriber station via the message. The at least one mobile subscriber station uses the information of the at least one neighbor station transmitted via the message to identify a network and to define characteristics of the at least one neighbor base station to an influential initial network entry for which the at least one mobile subscriber station is looking. The at least one mobile subscriber station uses the information transmitted via the message for a handover to a target base station among the neighbor base stations from the serving base station.

Each of the neighbor base stations is capable of transmitting its information to the serving base station and other neighbor base stations whenever its information change occurs. Each of the neighbor base stations is capable of transmitting its information periodically to the serving base station and other neighbor base stations. Meanwhile, the at least one mobile subscriber station is facilitated to tune a sync with the at least one neighbor base station, without monitoring a transmission from a target base station among the neighbor base stations, for downlink channel description broadcast and uplink channel description broadcast using the information of the neighbor base stations.

The inter-base station control messages include a base station information request message transmitted to request the neighbor base station information to the at least one neighbor base station from the serving base station and a base station information response message transmitted from each of the neighbor base stations to the serving base station and other neighbor base stations in response to the base station information request message.

The base station information request is a message describing a variety of parameters according to respectively allocated fields and includes an 8-bit message-type field, a 48-bit sender base station identifier, a 48-bit target base station identifier, a security field for authenticating the message, and a 32-bit error correction field. The error correction preferably uses a cyclic redundancy check (CRC) code. The base station information request message can be transmitted to the at least one neighbor base station from the serving base station via a server.

The base station information response is a message describing a variety of parameters according to respectively allocated fields and includes an 8-bit message type field, a 48-bit sender base station identifier, a 48-bit target base station identifier, a physical frequency, a configuration change count incremented in case of each change of information for a base station, a hysteresis threshold, a mobile-assisted handover (MAHO) report period, type length value (TLV) encoded information, a security field, and a 32-bit error correction (CRC) field. The base station information response message can be transmitted from the at least one neighbor base station to the serving base station via a server. The neighbor base station information includes a downlink center frequency, an uplink channel descriptor, and a downlink channel descriptor.

As mentioned in the foregoing description, the serving base station, which is providing a service, gives and takes parameters included in the network topology advertisement via the inter-base station control messages with the neighbor base stations. In doing so, the inter-base station control messages used in the embodiments of the present invention are classified into the base station information request message requesting the information of the corresponding neighbor base station and the base station information response message by which each of the base stations having received the base station information request message delivers its information to the requesting base station, i.e., the serving base station.

Table 1 shows an example of the base station information request message.

TABLE 1

| Field | Size | Notes |
| --- | --- | --- |
| message type | 8 bits | |
| sender BSID | 48 bits | unique base station identifier |
| target BSID | 48 bits | set to 0xffffff to indicate broadcast |
| security field | TBD | means to authenticate this message |
| CRC field | 32 bits | CRC 32 |

Table 2 shows an example of the base station information response message.

TABLE 2

| Field | Size | Notes |
| --- | --- | --- |
| message type | 8 bits | |
| sender BSID | 48 bits | unique base station identifier |
| target BSID | 48 bits | set to 0xffffff to indicate broadcast |
| physical frequency | | downlink center frequency (kHz) |
| configuration change count | | incremented for each change of the base station information |
| hysteresis threshold | | |
| MAHO report period | | |
| TLV encoded information | variable | TVL information as allowed on DCD and UCD |
| security field | TBD | means to authenticate this message |
| CRC field | 32 bits | CRC 32 |

The base stations directly give and take the control messages between themselves to share the information associated with their physical channel characteristics via the inter-base station control messages. Alternatively, the base stations operate a management function server between themselves to mutually obtain the information of the neighbor base stations via the management function server.

First Embodiment

In a method according to a first embodiment of the present invention, a serving base station transmits a base station information request message to neighbor base stations and receives a base station information response message from each of the neighbor base stations to update information of the neighbor base stations.

The method according to the first embodiment of the present invention includes the steps of initializing a serving base station, allowing the serving base station to obtain information of neighbor base stations by exchanging inter-base station control messages between the serving base station and the neighbor base stations over a backbone network, performing an initialization and registration process between the serving base station and mobile subscriber stations belonging to a governing domain of the serving base station, delivering the information of the neighbor base stations to the mobile subscriber stations from the serving base station via a message, and periodically performing the step of obtaining the information of the neighbor base stations to deliver the periodically obtained information of the neighbor base stations to the mobile subscriber stations from the serving base station and to update the information of the neighbor base stations periodically.

The inter-base station control messages include a base station information request message transmitted to request the information of the neighbor base stations to the neighbor base stations from the serving base station and a base station information response message transmitted from each of the neighbor base stations to the serving base station in response to the base station information request message.

Figure 4:
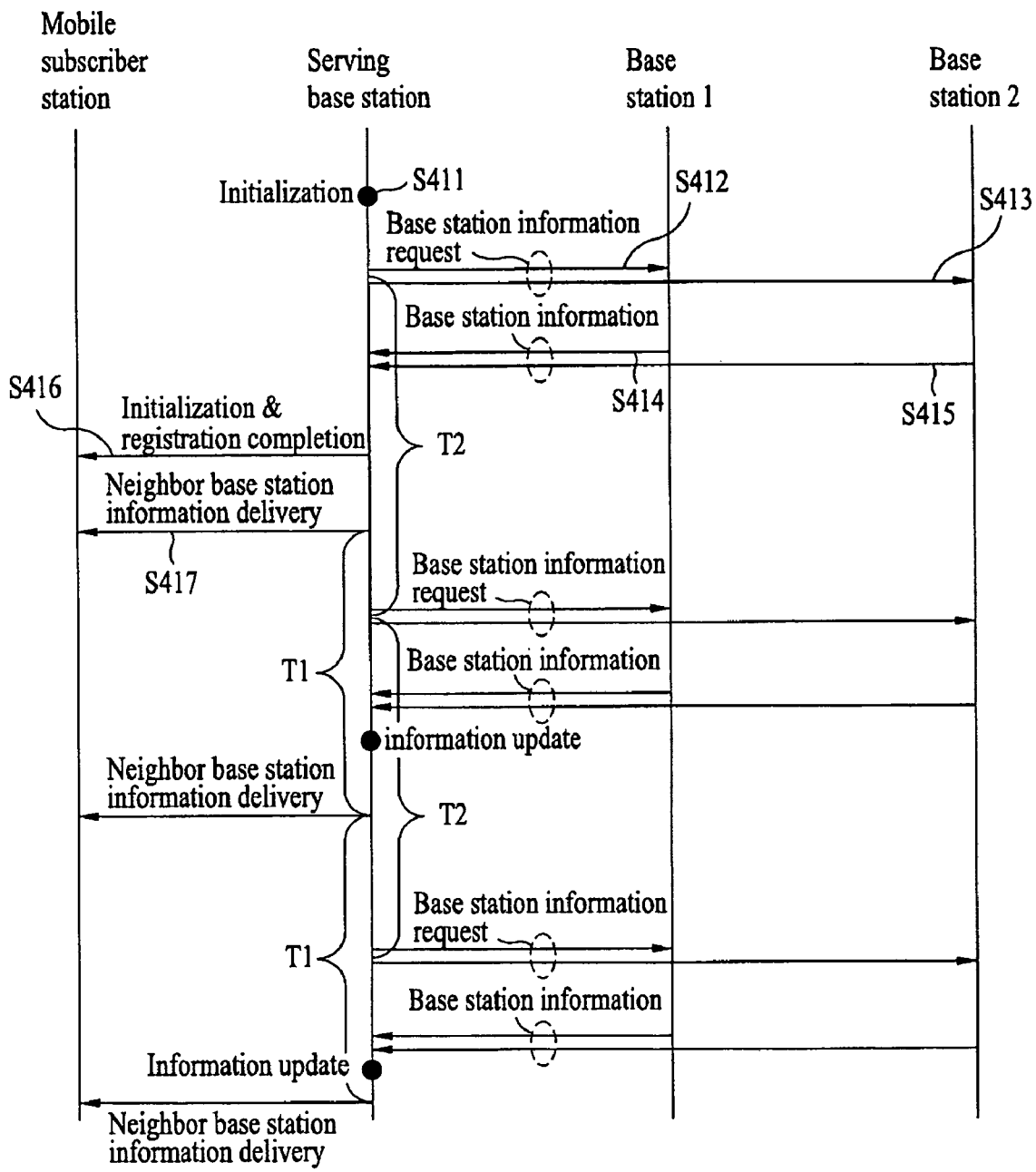
FIG. 4 is an exemplary operational flow diagram of a neighbor base station information transmission method according to a first embodiment of the present invention.

FIG. 4 is a flowchart of a neighbor base station information transmission method according to a first embodiment of the present invention.

Referring to FIG. 4, a serving base station performs an initialization process (S411) and then requests base station information from neighbor base stations, i.e., base stations 1 and 2 (S412, S413). Base stations 1 and 2 each transmit information including its physical channel characteristics to the serving base station in response to the neighbor base station information request (S414, S415).

Meanwhile, a mobile subscriber station performs an initialization and registration process for the serving base station (S416) and receives the information of the neighbor base stations from the serving base station (S417). The information of the neighbor base stations transmitted from the serving base station can be commonly transmitted to all mobile subscriber stations existing within a corresponding cell via a broadcast control message such as a neighbor advertisement (MOB_NBR-ADV) message, which will hereinafter be explained in detail.

Base stations supporting mobile functionality shall be capable of transmitting a MOB_NBR-ADV management message at a periodic interval (MOB_NBR-ADV interval) to identify the network and to define the characteristics of neighbor base station to potential mobile subscriber station seeking initial network entry or handover. If neighbor information is unavailable, this message need not be transmitted.

The neighbor advertisement message is a message describing a variety of parameters according to respectively allocated fields and includes an 8-bit management message type field, a 24-bit operator identifier, a 7-bit N_neighbors field, a 32-bit physical frequency field, an 8-bit length field, an 8-bit configuration change count, a 24-bit neighbor base station identifier, an 8-bit hysteresis threshold field, an 8-bit physical (PHY) profile identifier, an 8-bit frequency assignment index, an 8-bit base station equivalent isotropic radiated power (EIRP) field, an 8-bit preamble index/subchannel index, a 4-bit DCD configuration change count, a 4-bit UCD configuration change count, and TLV encoded neighbor information.

The operator identifier is the unique network identifier shared by an association of base stations. This field is present only if bit 0 of skip-optional-fields bitmap has a value of "0". The N_neighbors is the count of the unique combination of neighbor base station identifier, preamble index, and downlink channel descriptor. The configuration change count is incremented each time the information for the associated neighbor base station has changed. The neighbor base station identifier is an optional field, i.e., omitted for a skip-optional-fields flag value of "1," for an orthogonal frequency division multiple access (OFDMA) PHY layer. That is, the least significant 24 bits of the base station identifier is included in the DL-MAP message of the neighbor base station. This field is present only if bit 1 of skip-optional-fields bitmap is "0."

The length field indicates the length, in bytes, of message information within the iteration of N_Neighbor. The PHY profile identifier is an aggregation of the co-located frequency assignment indicator, frequency assignment configuration indicator, fast Fourier transform (FFT) size, bandwidth, operation mode (of the starting sub-channelization of a frame), and channel number. In more detail, the PHY profile identifier is an aggregate identifier including the co-located frequency assignment indicator bit, the frequency assignment configuration indicator bit, time/frequency synchronization indicator, base station EIRP indicator, DCD/UCD reference indicator, frequency assignment index indicator, and the frequency assignment number. If the co-located frequency assignment indicator bit is set, the following field of the NBR-ADV element, which includes a preamble index, handover process optimization, DCD/UCD configuration change count, and TLV-encoded neighbor information, may be omitted.

The frequency assignment index field is present only if the frequency assignment index indicator in PHY profile identifier is set. Otherwise, the neighbor base station has the same frequency assignment index or the center frequency is indicated using the TLV encoded information. If the frequency assignment index Indicator bit in the PHY profile identifier is set to "1," the frequency assignment index follows the PHY profile identifier. In addition, if the frequency assignment indicator is followed, the downlink center frequency shall be determined by a service provider or a governmental body (e.g., the FCC). The base station EIRP is a signed integer form from −128 dBm to +127 dBm. This field is present only if the base station EIRP indicator is set in the PHY profile identifier. Otherwise, the base station has the same EIRP as the serving base station. The neighbor base station EIRP is listed in a signed integer form from −128 dBm to +127 dBm. This field shall be omitted if the base station EIRP indicator bit in the PHY profile identifier is set to "0."

The preamble index/subchannel index parameter defines the PHY specific preamble for the SCa (signal carrier access below 11 GHz) and OFDMA PHY. For the OFDMA PHY, the five least significant bits contain the active downlink subchannel index used in the advertised base station sector. The three most significant bits shall be reserved and set to "0b000." The DCD configuration change count is represented by the four least significant bits of the current DCD configuration change count of the neighbor base station. The UCD configuration change count is represented by the four least significant bits of the current UCD configuration change count of the neighbor base station.

The TLV encoded neighbor information may include TLV parameters, DCD settings, UCD settings, and a PHY mode identifier.

The DCD settings is a compound TLV value that encapsulates a DCD message that may be transmitted in the advertised base station downlink channel. This information is intended to enable fast synchronization of the mobile subscriber station with the advertised base station downlink. The DCD settings fields shall contain only neighbor's DCD TLV values that are different from the serving base station corresponding values. The mobile base station assumes that all excluded values are identical to the corresponding values of the serving base station. The duplicate TLV encoding parameters within a neighbor base station are excluded from DCD settings.

The UCD settings is a compound TLV value that encapsulates a UCD message that may be transmitted in the advertised base station downlink channel. This information is intended to enable fast synchronization of the mobile subscriber station with the advertised base station uplink. The DCD settings fields shall contain only neighbor's UCD TLV values that are different from the serving base station's corresponding values. For values that are not included, the mobile subscriber station shall assume they are identical to the corresponding values of the serving base station. The duplicate TLV encoding parameters within a neighbor base station shall not be included in UCD settings.

The PHY mode identifier is a sixteen-bit value that specifies the PHY parameters, including channel bandwidth, FFT size, cyclic prefix, and frame duration.

The bit-by-bit definition of the PHY profile identifier of the base station will be explained hereinafter. The co-located frequency assignment indicator bit has one bit, the frequency assignment configuration indicator has one bit, the time/frequency synchronization indicator has two bits, the base station EIRP indicator has one bit, the DCD/UCD reference indicator has one bit, and the frequency assignment index indicator has one bit.

The co-located frequency assignment indicator bit is set to "1" if the base station (or frequency assignment) is co-located with the serving base station. When the frequency assignment configuration indicator bit is set to "1," the base station has the same frequency assignment configuration, i.e., the same number of frequency assignments having the same frequencies, as the base station broadcasts the NBR-ADV message. The time/frequency synchronization indicator value is set to "00" to indicate an unsynchronized condition, is set to "01" to indicate time synchronization, and is set to "10" to indicate time and frequency synchronization. If the time synchronization is indicated for the OFDMA PHY, then the downlink frames transmitted by the serving base station and the neighbor base station shall be synchronized to a level of at least ⅛ cyclic prefix length. If the frequency synchronization is indicated for the OFDMA PHY, then the base station reference clock shall be synchronized to a level that yields RF center frequency offset of no more than 4% of the OFDMA carrier spacing of the neighbor base station.

If the base station EIRP indicator bit (one bit) is "1," the base station EIRP follows the PHY profile identifier. If the DCD/UCD reference indicator bit (one bit) is set to "1," the DCD/UCD settings of the neighbor base station are the same as those of the preceding neighbor base station unless the TLV information is specified. If the DCD/UCD reference indicator bit (one bit) is set to "0," the DCD/UCD settings of the neighbor base station are the same as those of the serving base station unless the TLV information is specified. Only if the frequency assignment index indicator (one bit) is set to "1," the frequency assignment index follows the PHY profile identifier. In addition, if the frequency assignment indicator is followed, the downlink center frequency shall be omitted in the DCD/UCD difference TLV information. One bit may be reserved for future use.

For OFDMA PHY, the physical mode identifier has fields such as channel bandwidth (seven bits), FFT size (three bits), cyclic prefix (two bits), and frame duration code (four bits). The channel bandwidth is a bandwidth expressed in units of 125 Khz. Regarding the FFT size (three bits), a value of "0b01" indicates a size of 256. Values 0b000-0b01 and 0b0100-0b111 are reserved. Regarding the cyclic prefix (two bits), "00," "01," "10," and "11" indicate cyclic prefixes of ¼, ⅛, ¹⁄₁₆, and ¹⁄₃₂, respectively. Regarding the frame duration code (four bits), values of "0000," "0001," "0010," "0011," "0100," "0101," "0110," and "0111-1111" indicate durations of 2.5 ms, 4 ms, 5 ms, 8 ms, 10 ms, 12.5 ms, 20 ms, and "reserved," respectively.

The above procedure of the first embodiment as shown in FIG. 4 can be periodically performed. Namely, the serving base station sends a base station information request to each neighbor base station at a periodic interval T2, and the base station information received in response is transmitted to the mobile subscriber station at a periodic interval T1.

The first embodiment may be achieved by a direct transfer of the inter-base station control messages as shown in FIG. 4. As an alternative, a management function server may be applied as shown in FIG. 5.

Figure 5:
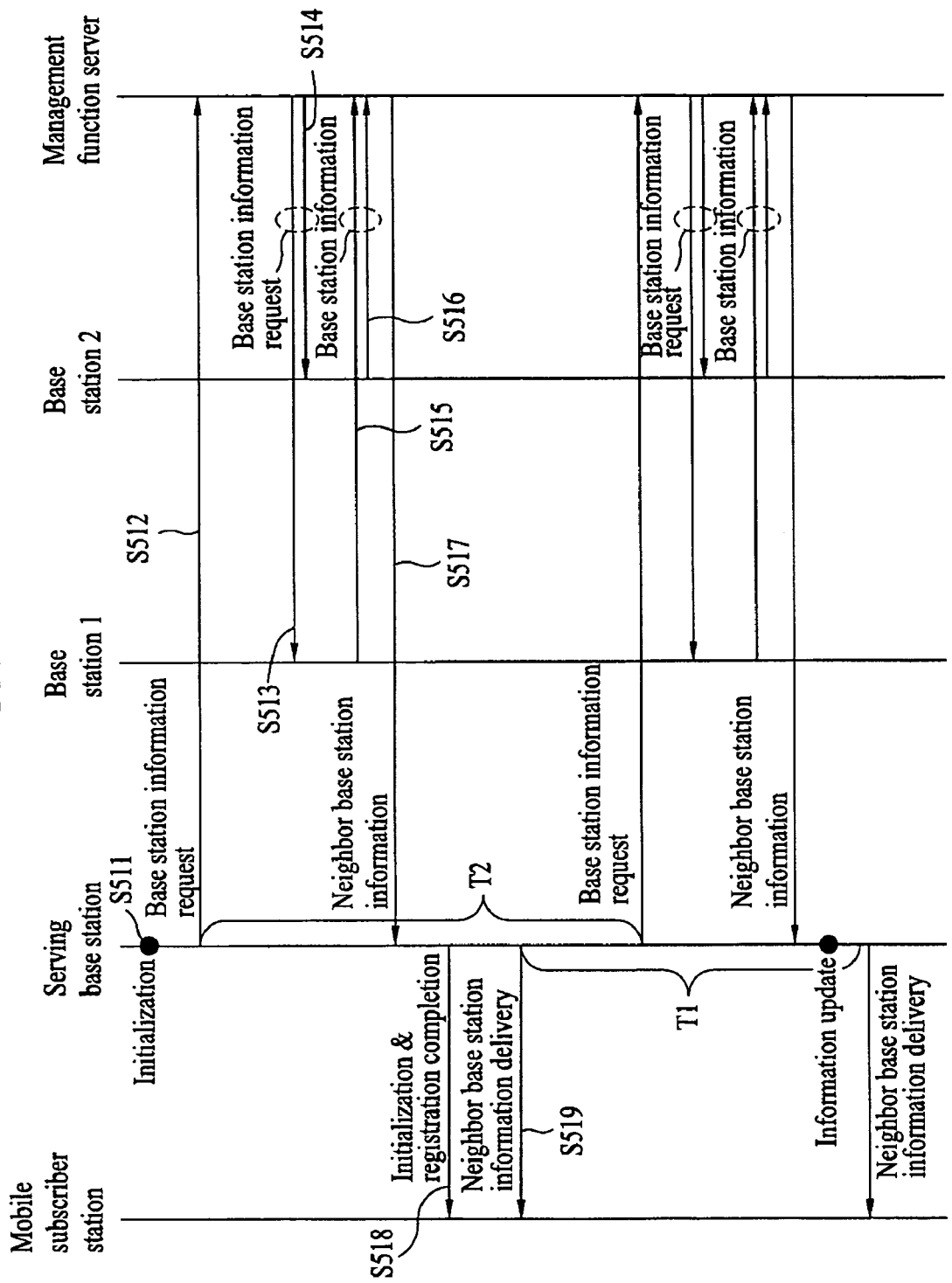
FIG. 5 is an exemplary operational flow diagram of the first-embodiment method applying a management function server.

Referring to FIG. 5, the neighbor base station information transmission method using a management function server includes the steps of initializing a serving base station; allowing the serving base station to obtain information of neighbor base stations by exchanging inter-base station control messages between the serving base stations and the neighbor base stations over a backbone network via a server, i.e., the management function server; performing an initialization and registration process between the serving base station and mobile subscriber stations connected to the serving base station; delivering the information of the neighbor base stations to the mobile subscriber stations from the serving base station via a message; and periodically performing the step of obtaining the information of the neighbor base stations to deliver the periodically obtained information of the neighbor base stations to the mobile subscriber stations from the serving base station and to update the information of the neighbor base stations periodically.

The inter-base station control messages include a first base station information request message transmitted from the serving base station, to request the information of the neighbor base stations from the server, a second base station information request message transmitted from the server to the neighbor base stations according to the first base station information request message, a first base station information response message transmitted from each of the neighbor base stations to the server in response to the second base station information request message, and a second base station information response message transmitted to the serving base station from the server.

Referring to FIG. 5, the serving base station performs the initialization process (S511) and then requests the information of the neighbor base stations from the management function server (S512). If so, the management function server requests base station information from the neighbor base stations, i.e., base stations 1 and 2 (S513, S514), and receives information containing physical channel characteristics of the corresponding neighbor base station from each of the neighbor base stations (S515, S516). In response to the neighbor base station information request of the step S512 from the serving base station, the management function server transmits the information of the neighbor base stations to the serving base station (S517).

Meanwhile, the mobile subscriber station performs an initialization and registration process on the serving base station (S518) and receives the information of the neighbor base stations from the serving base station (S519). The information of the neighbor base stations transmitted from the serving base station can be commonly transmitted to all mobile subscriber stations existing within a corresponding cell via a broadcast control message.

The above procedure, as shown in FIG. 5, can be periodically performed. Namely, the serving base station requests the base station information to the neighbor base stations at a periodic interval T2 and transmits the base station information received from the neighbor base stations to the mobile subscriber station at a periodic interval T1.

Second Embodiment

A second embodiment of the present invention relates to a method of updating information of neighbor base stations by periodically receiving base station information from the neighbor base stations at a periodic interval without a request from a serving base station.

The method according to the second embodiment of the present invention includes the steps of initializing a serving base station, allowing the serving base station to obtain information of neighbor base stations by exchanging inter-base station control messages between the serving base station and the neighbor base stations over a backbone network, performing an initialization and registration process between the serving base station and mobile subscriber stations within the serving base station, delivering the information of the neighbor base stations to the mobile subscriber stations from the serving base station via a message, and allowing each of the neighbor base stations to periodically transmit its information to the serving base station via the inter-base station control message without a request from the serving base station to deliver the periodically obtained information of the neighbor base stations to the mobile subscriber stations from the serving base station and to update the information of the neighbor base stations periodically.

The inter-base station control messages include a base station information request message transmitted from the serving base station, to request the information of the neighbor base stations from the neighbor base stations, and a base station information response message transmitted from each of the neighbor base stations to the serving base station in response to the base station information request message.

Figure 6:
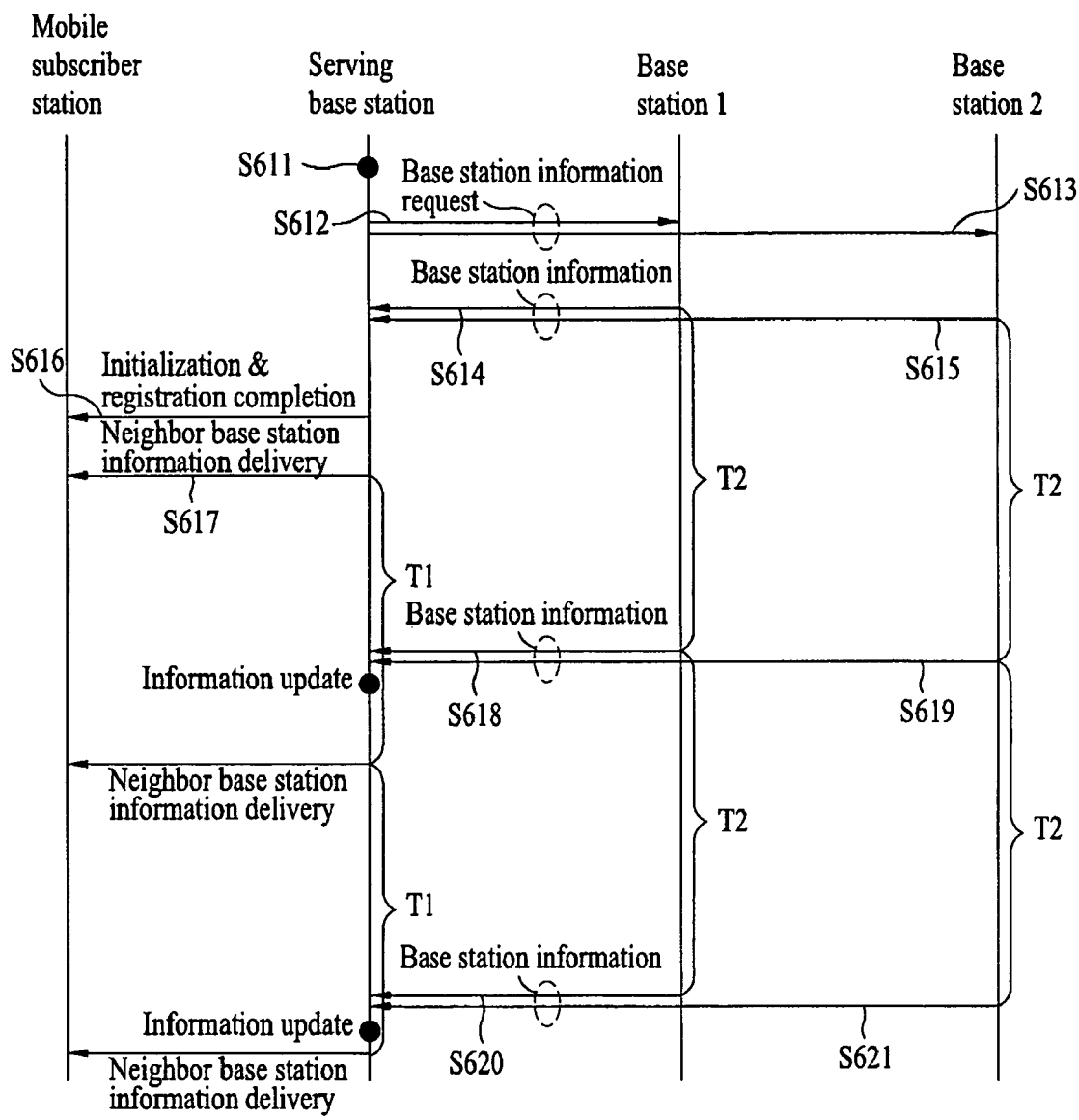
FIG. 6 is an exemplary operational flow diagram of a neighbor base station information transmission method according to a second embodiment of the present invention.

FIG. 6 illustrates a neighbor base station information transmission method according to a second embodiment of the present invention.

Referring to FIG. 6, a serving base station performs an initialization process (S611) and then requests base station information from neighbor base stations, i.e., base stations 1 and 2 (S612, S613). Base stations 1 and 2 each transmit information including its physical channel characteristics to the serving base station in response to the neighbor base station information request (S614, S615).

Meanwhile, a mobile subscriber station belonging to a governing domain of the serving base station performs an initialization and registration process for the serving base station (S616) and receives the information of the neighbor base stations from the serving base station (S617). The information of the neighbor base stations transmitted from the serving base station can be commonly transmitted to all mobile subscriber stations existing within a corresponding cell via a broadcast control message.

In the second embodiment of the present invention, the neighbor base stations periodically transmit their information to the serving base station without the information request of the neighbor base stations made by the serving base station (S618 to S621).

Figure 7:
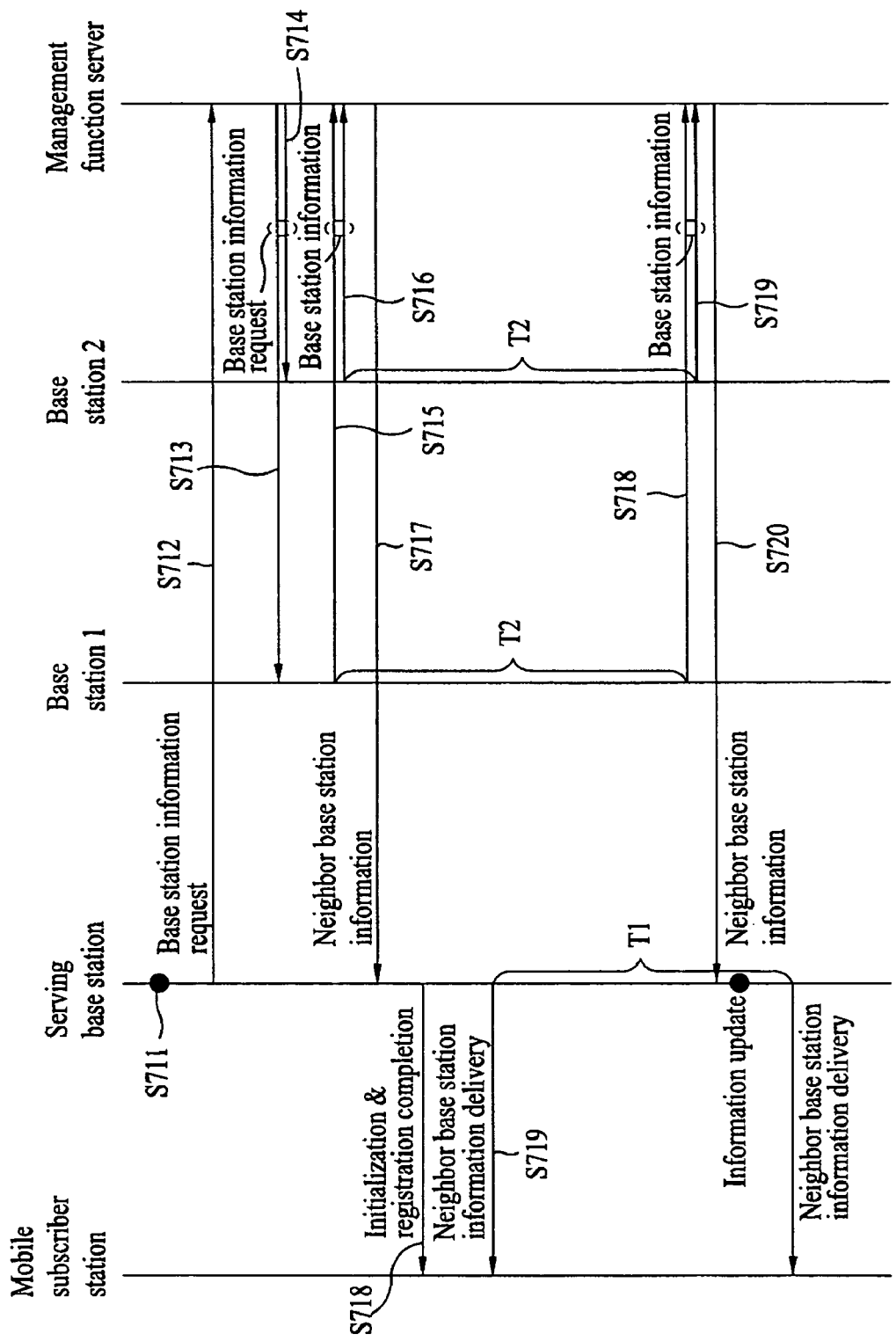
FIG. 7 is an exemplary operational flow diagram of the second-embodiment method applying a management function server.

FIG. 7 illustrates a method using a management function server according to the second embodiment of the present invention. The method includes the steps of initializing a serving base station, allowing the serving base station to obtain information of neighbor base stations by exchanging inter-base station control messages between the serving base station and the neighbor base stations over a backbone network via a server, performing an initialization and registration process between the serving base station and mobile subscriber stations within the serving base station, delivering the information of the neighbor base stations to the mobile subscriber stations from the serving base station via a message, and allowing each of the neighbor base stations to periodically transmit an inter-base station control message containing its information to the serving base station via the server without a request from the serving base station to deliver the periodically obtained information of the neighbor base stations to the mobile subscriber stations from the serving base station and to update the information of the neighbor base stations within the serving base station periodically.

The inter-base station control messages include a first base station information request message transmitted from the serving base station, to request the information of the neighbor base stations from the server; a second base station information request message transmitted from the server to the neighbor base stations according to the first base station information request message; a first base station information response message transmitted from each of the neighbor base stations to the server in response to the second base station information request message; and a second base station information response message transmitted to the serving base station from the server.

Referring to FIG. 7, a serving base station performs an initialization process (S711) and then transmits requests to a management function server information of neighbor base stations, i.e., base stations 1 and 2 (S712). If so, the management function server requests base station information from the neighbor base stations (S713, S714) and receives information containing their physical channel characteristics from the neighbor base stations (S715, S716). The management function server transmits the information of the neighbor base stations to the serving base station in response to the neighbor base station information request of the step S712 (S717).

Meanwhile, a mobile subscriber station performs an initialization and registration process for the serving base station (S718) and receives the information of the neighbor base stations from the serving base station (S719). The information of the neighbor base stations transmitted from the serving base station can be commonly transmitted to all mobile subscriber stations existing within a corresponding cell via a broadcast control message.

In the embodiment shown in FIG. 7, even though the management function server does not request the base station information to the neighbor base stations, the neighbor base stations periodically transmit their information to the management function server (S718, S719). Meanwhile, the management function server, even if the information of the neighbor base stations is not requested by the serving base station, periodically transmits the information of the neighbor base stations to the serving base station (S720).

Third Embodiment

A third embodiment of the present invention relates to a method of allowing a serving base station to update information of neighbor base stations by having each of the neighbor base stations transmit a message containing its base station information to the serving base station each time the information of the corresponding neighbor base station is changed.

The method according to the third embodiment of the present invention includes the steps of initializing a serving base station, allowing the serving base station to obtain information of neighbor base stations by exchanging inter-base station control messages between the serving base station and the neighbor base stations over a backbone network, performing an initialization and registration process between the serving base station and mobile subscriber stations belonging to a governing domain of the serving base station, delivering the information of the neighbor base stations to the mobile subscriber stations from the serving base station via a message, and allowing each of the neighbor base stations to transmit its information to the serving base station and other neighbor base stations via the inter-base station control message without a request from the serving base station each time its base station information is changed wherein the serving base station delivers the corresponding information to the mobile subscriber stations each time the changed base station information is received from each of the neighbor base stations and wherein the serving base station updates the changed base station information of each of the neighbor base stations within the serving base station itself.

The inter-base station control messages include a base station information request message transmitted from the serving base station, to request the information of the neighbor base stations from the neighbor base stations, and a base station information response message transmitted from each of the neighbor base stations to the serving base station in response to the base station information request message.

Figure 8:
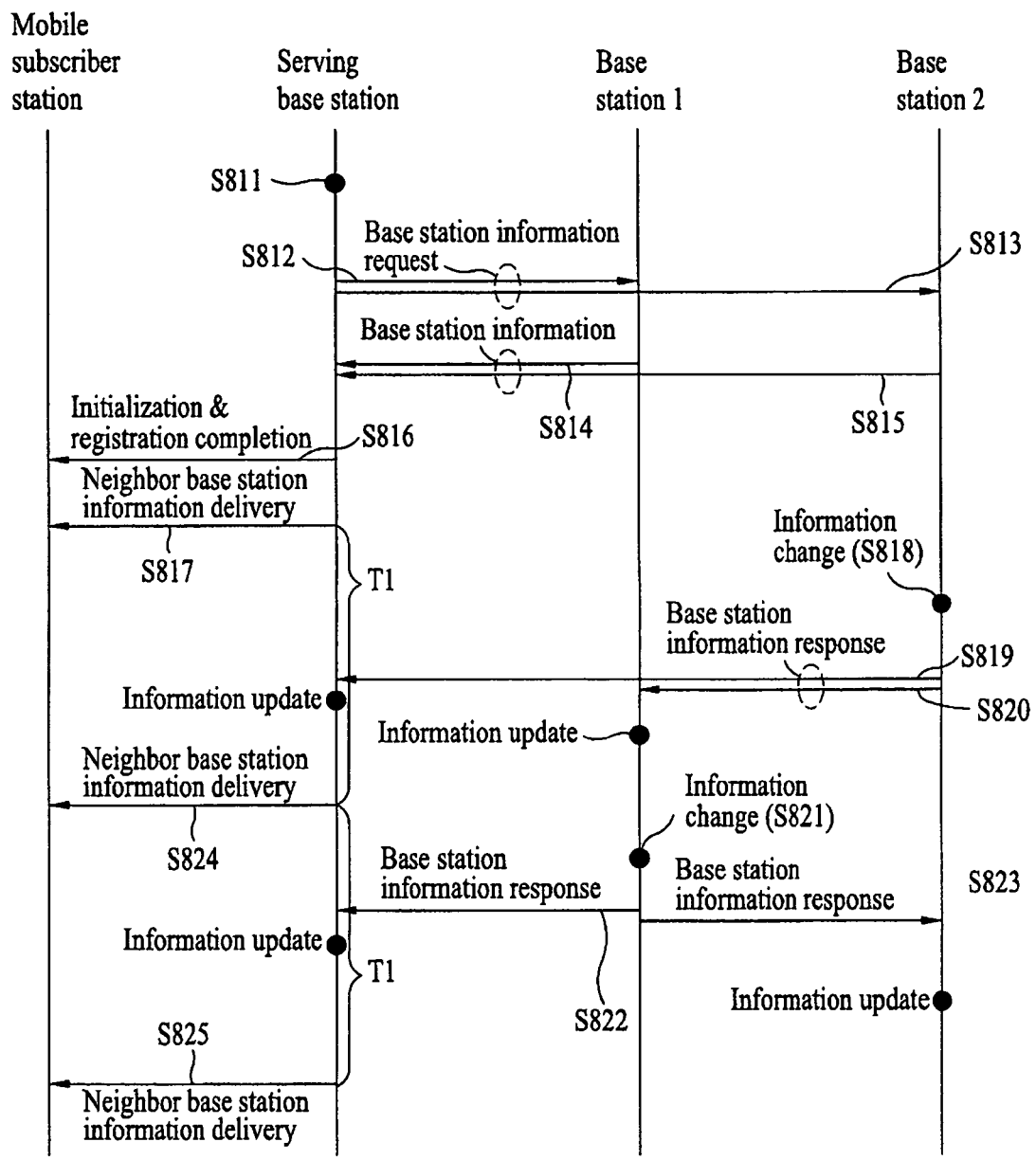
FIG. 8 is an exemplary operational flow diagram of a neighbor base station information transmission method according to a third embodiment of the present invention.

FIG. 8 illustrates a neighbor base station information transmission method according to a third embodiment of the present invention.

Referring to FIG. 8, a serving base station performs an initialization process (S811) and then requests base station information from neighbor base stations, i.e., base stations 1 and 2 (S812, S813). Base stations 1 and 2 each transmit information including its physical channel characteristics to the serving base station in response to the neighbor base station information request (S814, S815).

Meanwhile, a mobile subscriber station performs an initialization and registration process for the serving base station (S816) and receives the information of the neighbor base stations from the serving base station (S817). The information of the neighbor base stations transmitted from the serving base station can be commonly transmitted to all mobile subscriber stations existing within a corresponding cell via a broadcast control message. In this case, the broadcast control message has the same parameters of the message mentioned in the first embodiment of the present invention. The inter-base station control message has the same parameters of the message mentioned in the first embodiment of the present invention as well.

In the third embodiment of the present invention, each of the neighbor base stations transmits its information to the serving base station and other neighbor base stations (S819, S820, S822, S823) in case that its base station information is changed (S818, S821). The serving base station having received the information of the neighbor base station transmits the information of the neighbor base stations to the mobile subscriber stations.

Figure 9:
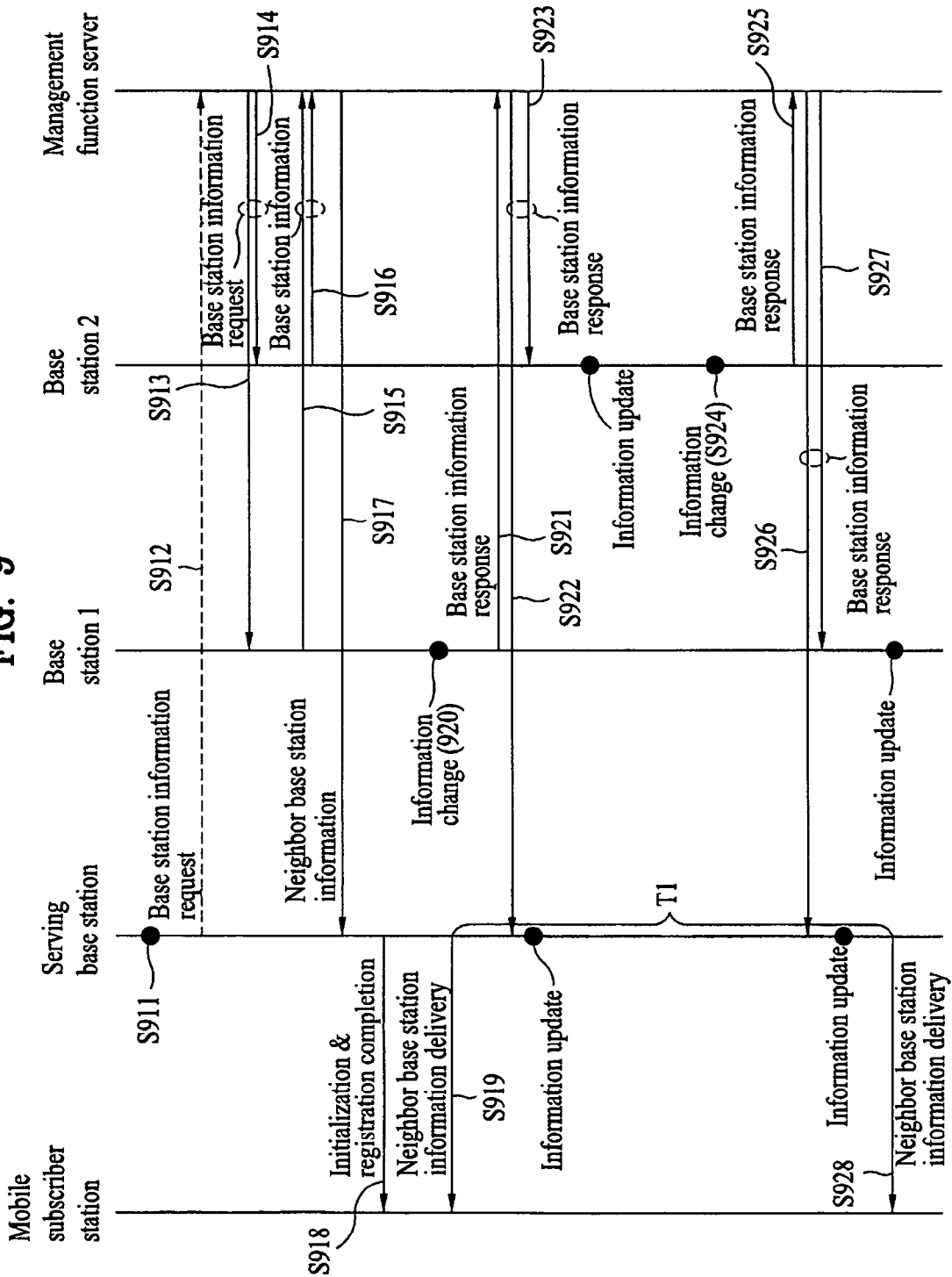
FIG. 9 is an exemplary operational flow diagram of the third-embodiment method applying a management function server.

FIG. 9 illustrates a method using a management function server according to the third embodiment of the present invention. The method includes the steps of initializing a serving base station, allowing the serving base station to obtain information of neighbor base stations by exchanging inter-base station control messages between the serving base station and the neighbor base stations over a backbone network via a server, performing an initialization and registration process between the serving base station and mobile subscriber stations within the serving base station, delivering the information of the neighbor base stations to the mobile subscriber stations from the serving base station via a message, and allowing each of the neighbor base stations to deliver the inter-base station control message containing its changed information to the serving base station via the server without a request from the serving base station each time its base station information is changed wherein the serving base station delivers the corresponding information to the mobile subscriber stations each time the changed base station information is received from each of the neighbor base stations and wherein the serving base station updates the changed base station information of each of the neighbor base stations within the serving base station itself.

The inter-base station control messages include a first base station information request message transmitted from the serving base station, to request the information of the neighbor base stations from the server; a second base station information request message transmitted from the server to the neighbor base stations according to the first base station information request message; a first base station information response message transmitted from each of the neighbor base stations to the server in response to the second base station information request message; and a second base station information response message transmitted to the serving base station from the server.

Referring to FIG. 9, a serving base station performs an initialization process (S911) and then requests information of neighbor base stations, i.e., base stations 1 and 2, from a management function server (S912). If so, the management function server sends a requests base station information to the neighbor base stations (S913, S914) and receives information containing its physical channel characteristics from each of the neighbor base stations (S915, S916). The management function server transmits the information of the neighbor base stations to the serving base station in response to the neighbor base station information request of the step S912 (S917).

Meanwhile, a mobile subscriber station performs an initialization and registration process for the serving base station (S918) and receives the information of the neighbor base stations from the serving base station via a broadcast control message or the like (9719). The information of the neighbor base stations transmitted from the serving base station can be commonly transmitted to all mobile subscriber stations existing within a corresponding cell via a broadcast control message.

In the embodiment shown in FIG. 9, in case that information of each of the neighbor base stations is changed (S920, S924), each of the neighbor base stations transmits its changed base station information to the management function server (S921, S925). Meanwhile, the management function server transits the changed base station information to the serving base station and other neighbor base stations (S922, S923, S926, S927).

According to the first, second, and third embodiments of the present invention as described above, the serving base station receives the information of the neighbor base stations via the inter-base control messages from the neighbor base stations and then updates the information. The serving base station then provides the information of the neighbor base stations to the corresponding mobile subscriber stations to enable the mobile subscriber stations to perform quick handover using the previously received neighbor base station information. The mobile subscriber station, having received the information of the neighbor base stations from the serving base station, temporarily synchronizes with each neighbor base station at predetermined times to measure signal quality, and then, if necessary, uses the previously received base station information to execute a handover procedure. That is, the mobile subscriber station uses the neighbor base station information for a specific purpose, which may be a handover operation between the first base station and a target base station of the at least one neighbor base station or an instance of network entry.

In spite of exchanging the information of the mobile subscriber stations between the base stations, the related art fails to provide a technology of allowing the base stations to exchange their information with each other over the backbone network. Hence, the parameters contained in the related art control message exchanged between the base stations are different from those of the present invention.

Handover operations are not determined or controlled by the mobile subscriber stations (e.g., cellular phones) in a 3GPP CDMA mobile communication system, which instead uses a handover wireless network controller to provide to a mobile subscriber station, prior to handover, a set of handover parameters corresponding to the target base station. In the present invention on the other hand, the mobile subscriber station itself determines and controls a handover operation, which is enabled by updated neighbor base station information being communicated in advance, so that signal quality with respect to the target base station may be measured for performing a handover operation or for network entry. The present invention may be less applicable in 3GPP CDMA mobile communications due to cellular telephone power limitations and is more applicable to the mobile subscriber station of a portable wireless Internet system using mobile terminals having higher power capacities.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of communicating neighbor base station information in a mobile communication system, the method comprising:

receiving, by a neighbor base station, a request message from a serving base station for requesting the neighbor base station information;

transmitting, by the neighbor base station to the serving base station, a response message comprising the neighbor base station information, wherein the neighbor base station information includes physical channel information for connecting to the neighbor base station, parameters for an uplink channel descriptor (UCD), and parameters for a downlink channel descriptor (DCD);

broadcasting a first neighbor advertisement message comprising the neighbor base station information by the serving base station to all mobile subscriber stations located in a corresponding cell of the serving base station, wherein the first neighbor advertisement message is repeatedly broadcast at a first periodic interval;

receiving, by the serving base station from the neighbor base station, a backbone message comprising updated neighbor base station information at each of second periodic intervals to update a change in the neighbor base station information without the serving base station requesting the backbone message, wherein the updated neighbor base station information includes at least updated physical channel information for connecting to the neighbor base station, updated parameters for the UCD or updated parameters for the DCD; and broadcasting a second neighbor advertisement message following the first periodic interval from the serving base station to all the mobile subscriber stations located in the corresponding cell of the serving base station, wherein the second neighbor advertisement message comprises the updated neighbor base station information;

wherein the parameters for the UCD comprise first type-length-value (TLV) values of the neighbor base station which are different from first corresponding values of the serving base station, and the parameters for the DCD comprise second TLV values of the neighbor base station which are different from second corresponding values of the serving base station.

2. The method of claim 1, wherein the request message and the response message are transmitted over a backbone network.

3. The method of claim 1, wherein the backbone message further comprises a DCD count and a UCD count.

4. The method of claim 1, wherein the first neighbor advertisement message and the second neighbor advertisement message each further comprise fields for a management message type, a serving base station identification, a neighbor base station identification, a physical frequency, a configuration change count incremented for each change in the neighbor base station information, a hysteresis threshold, a mobile-assisted handover report period, type-length-value-encoded information, a message authentication, and an error correction.

5. The method of claim 4, wherein the configuration change count includes a DCD count and a UCD count, wherein the DCD count represents a current DCD count of the neighbor base station and the UCD count represents a current UCD count of the neighbor base station.

6. The method of claim 1, wherein the parameters for the UCD encapsulate a UCD message that can be transmitted via a downlink channel of the neighbor base station, and wherein the parameters for the DCD encapsulate a DCD message that can be transmitted via the downlink channel of the neighbor base station.

7. The method of claim 6, wherein at least one of the mobile subscriber stations seeks initial network entry or a handover.

8. The method of claim 7, wherein the first neighbor advertisement message and the second neighbor advertisement message are broadcast to identify a network and define characteristics of the neighbor base station for an instance of network entry.

9. The method of claim 8, wherein the backbone message is transmitted from the neighbor base station to the serving base station for each change in the neighbor base station information.

10. A mobile communication system for communicating neighbor base station information, the mobile communication system comprising:
    a serving base station; and
    a neighbor base station,
    wherein the neighbor base station is configured to:
        receive a request message from the serving base station for requesting the neighbor base station information, and
        transmit a response message comprising the neighbor base station information, wherein the neighbor base station information includes physical channel information for connecting to the neighbor base station, parameters for an uplink channel descriptor (UCD), and parameters for a downlink channel descriptor (DCD), and
    wherein the serving base station is configured to:
        broadcast a first neighbor advertisement message comprising the neighbor base station information to all mobile subscriber stations located in a corresponding cell of the serving base station, wherein the first neighbor advertisement message is repeatedly broadcast at a first periodic interval,
        receive, from the neighbor base station, a backbone message comprising updated neighbor base station information repeatedly at a second periodic interval to update a change in the neighbor base station information without the serving base station requesting the backbone message, wherein the updated neighbor base station information includes at least updated physical channel information for connecting to the neighbor base station, updated parameters for the UCD or updated parameters for the DCD, and
        broadcast a second neighbor advertisement message following the first periodic interval to all the mobile subscriber stations located in the corresponding cell of the serving base station, wherein the second neighbor advertisement message comprises the updated neighbor base station information;
    wherein the parameters for the UCD comprise first type-length-value (TLV) values of the neighbor base station which are different from first corresponding values of the serving base station, and the parameters for the DCD comprise second TLV values of the neighbor base station which are different from second corresponding values of the serving base station.

11. The mobile communication system according to claim 10, wherein the request message and the response message are transmitted over a backbone network.

12. The mobile communication system according to claim 10, wherein the backbone message further comprises a DCD count and a UCD count.

13. The mobile communication system according to claim 10, wherein the first neighbor advertisement message and the second neighbor advertisement message each further comprise fields for a management message type, a serving base station identification, a neighbor base station identification, a physical frequency, a configuration change count incremented for each change in the neighbor base station information, a hysteresis threshold, a mobile-assisted handover report period, type-length-value-encoded information, a message authentication and an error correction.

14. The mobile communication system according to claim 13, wherein the configuration change count includes a DCD count and a UCD count, wherein the DCD count represents a current DCD count of the neighbor base station and the UCD count represents a current UCD count of the neighbor base station.

15. The mobile communication system according to claim 10, wherein the parameters for the UCD encapsulate a UCD message that can be transmitted via a downlink channel of the neighbor base station, and wherein the parameters for the DCD encapsulate a DCD message that can be transmitted via the downlink channel of the neighbor base station.

16. The mobile communication system according to claim 15, wherein at least one of the mobile subscriber stations seeks initial network entry or a handover.

17. The mobile communication system according to claim 16, wherein the first neighbor advertisement message and the second neighbor advertisement message are broadcast to identify a network and define characteristics of the neighbor base station for an instance of network entry.

18. The mobile communication system according to claim 17, wherein the backbone message is transmitted from the neighbor base station to the serving base station for each change in the neighbor base station information.

* * * * *